Patented July 18, 1939

2,166,487

UNITED STATES PATENT OFFICE 2,166,487

CONDENSATION PRODUCTS FROM CYANO-ACETIC ACID ARYLIDES

Friedrich Felix and Rudolf Ruegg, Basel, Switzerland, assignors to the firm Society of Chemical Industry in Basle, Basel, Switzerland No Drawing. Application January 5, 1938, Serial No. 183,536. In Switzerland January 9, 1937

5 Claims. (Cl. 260—465)

It has been found that products of the general formula

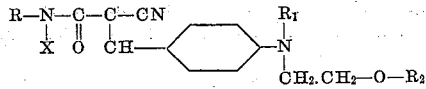

wherein R stands for an aryl radical of the benzene series, X stands for hydrogen or alkyl, $R_1$ and $R_2$ stand for alkyl groups containing not more than three carbon atoms, dye esters and ethers of cellulose fast yellow tints. These products are obtained by condensing compounds of the general formula

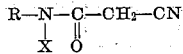

wherein X is hydrogen or alkyl, and R is an aryl radical of the benzene series, with aldehydes of the general formula

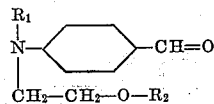

in which $R_1$ and $R_2$ stand for alkyl radicals containing not more than three carbon atoms. These products are yellow powders which dissolve in organic solvents such as ethyl acetate and acetone to yellow solutions and dye the esters and ethers of cellulose similar tints.

Compounds of the general formula

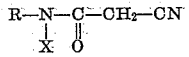

wherein R and X have the signification indicated above include the various arylides of the cyano-acetic acid, such as cyano-acetic acid anilide, cyano-acetic acid methylanilide, cyano-acetic acid ethylanilide, cyano-acetic acid propylanilide, cyano-acetic acid hydroxyethylanilide, cyano-acetic acid methoxy-ethylanilide. Further also such arylides of the cyano-acetic acid which contain in the aryl radical substituents such as nitro groups, alkyl groups, further methyl, ethyl and propyl groups. They may also be substituted by hydroxyl groups and by alkylated hydroxyl groups such as methoxy groups and ethoxy groups. There come also into consideration cyano-acetic acid nitro-anilides, cyano-acetic acid ortho-, meta- and para-toluides, cyano-acetic acid ortho-, meta- and para-anisidide, and also cyano-acetic acid methyl anisidides, further also cyano-acetic acid cresidides, cyano-acetic acid xylidides, and cyano-acetic acid-hydroxy-phenyl amides.

As compounds of the second general formula there may be named (N-alkyl-N-alkoxy-alkyl)-para-aminobenzaldehyde, such as (N-methyl-N-methoxyethyl)-para-aminobenzaldehyde, (N-ethyl-N-methoxyethyl)-para-aminobenzaldehyde, (N-propyl-N-methoxyethyl)-para-aminobenzaldehyde, (N-ethyl-N-ethoxyethyl)-para-aminobenzaldehyde.

The new condensation products are yellow to orange substances which dissolve in organic solvents such as acetone or ethyl acetate to intensely greenish yellow to yellow solutions. They may, therefore, be used with success as glazing lacquer colors, particularly in the preparation of transparent colored lacquers which are produced on a basis of natural or artificial resin, of nitrocellulose, of acetylcellulose or the like. They may also be used for coloring artificial materials, for instance condensation products from phenol or urea and formaldehyde. They are especially suitable for dyeing cellulose esters and ethers, above all acetate artificial silk. On these materials they produce dyeings which are characterized by their clarity and advantageous properties of fastness.

The following examples illustrate the invention, the parts being by weight:

*Example 1*

160 parts of cyano-acetic acid anilide together with 207 parts of (N-ethyl-N-methoxyethyl)-para-aminobenzaldehyde (obtainable as indicated in German Patent Nos. 103,578, 105,103 and 105,105) are dissolved in about 2500 parts of alcohol and the solution after addition of a base, for example piperidine or some alkali or sodium alcoholate, is boiled for some time under reflux. During the boiling there is soon produced an intensely yellow color due to the formation of the condensation product. Boiling is continued until the intensity of the color no longer increases, this indicating the end of the reaction. The whole is cooled while stirring during which the condensation product of the formula

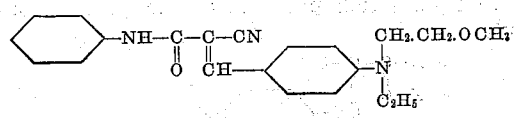

separates. It is a yellow powder soluble in organic solvents, for instance acetone or ethyl acetate, forming a green-yellow solution; when it is brought into a suitable state of subdivision, for instance by grinding it with a dispersing agent such as sulphite cellulose liquor, the sulfonated residues of the benzaldehyde manufacture and water, it dyes acetate artificial silk fast green-yellow tints. The same product is obtained if, instead of the aldehyde, its benzylidene compound is used, this being obtainable as described in the aforesaid German patents.

The procedure is similar if, instead of cyano-acetic acid anilide, any other arylide of cyano-acetic acid is used, for instance, cyano-acetic acid ethylanilide or hydroxyethylanilide.

*Example 2*

207 parts of N-ethyl-N-methoxyethyl-para-aminobenzaldehyde are dissolved in alcohol and 190 parts of cyano-acetic acid orthoanisidide and a small proportion of piperidine or other catalyst as well as a small proportion of an alkali are added. Then the whole is heated in a reflux apparatus. The precipitated dyestuff is filtered and dried. It corresponds to the formula

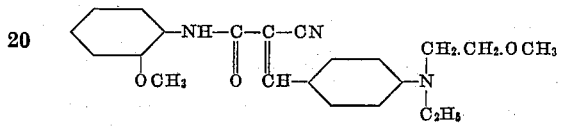

and is a yellow powder soluble in organic solvents such as acetone or ethyl acetate to a yellow solution. In a dispersed form it dyes acetate artificial silk green-yellow tints of good fastness to sublimation and washing.

The same product is obtained if, instead of the aldehyde named, a benzylidene compound thereof, for instance that with aniline-3-sulfonic acid, is used. The condensation may be performed in aqueous solution.

The procedure is the same when making condensation products from cyano-acetic acid para-anisidide, cyano-acetic acid para-cresidide, cyano-acetic acid meta-toluidide or the like. Instead of the aldehyde named there may be used N-methyl-N-methoxy-ethyl-para-aminobenzaldehyde or N-ethyl-N-alkoxyethylaminobenzaldehyde.

*Example 3*

10 parts of the dyestuff made as described in Example 2 are stirred to form a uniform paste containing 10 per cent of dyestuff with a suitable dispersing agent such as Turkey red oil or sulfite cellulose liquor. 0.5 part of this paste is very intimately mixed with 10 parts of water at 50° C. and so much of a concentrated soap solution that the dye bath produced corresponds with a soap solution of 2 parts per mille. Cold water is then added to produce 300 parts, 10 parts of acetate artificial silk yarn are entered into the emulsion thus prepared and are handled therein, the bath being heated within ¾ hour to 80–85° C. and dyeing continued for ¼ hour at this temperature. The goods are rinsed and brightened as usual. A greenish yellow acetate silk is produced. The dyeing is characterized by its excellent fastness to sublimation and water.

What we claim is:

1. Condensation products of the general formula

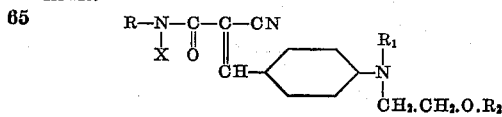

in which R stands for an aryl radical of the benzene series, X stands for a radical of the group consisting of hydrogen and alkyl, and $R_1$ and $R_2$ stand for alkyl groups containing not more than three carbon atoms, which products are yellow powders dissolving in organic solvents such as ethyl acetate and acetone, to yellow solutions and dyeing esters and ethers of cellulose similar tints.

2. Condensation products of the general formula

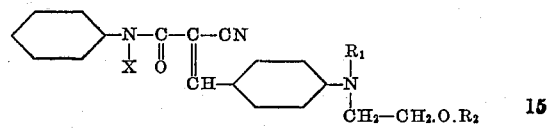

in which X stands for a radical of the group consisting of hydrogen and alkyl, and $R_1$ and $R_2$ stand for alkyl groups containing not more than three carbon atoms, which products are yellow powders dissolving in organic solvents such as ethyl acetate and acetone, to yellow solutions and dyeing esters and ethers of cellulose similar tints.

3. Condensation products of the general formula

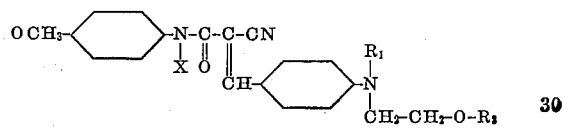

in which X stands for a radical of the group consisting of hydrogen and alkyl, and $R_1$ and $R_2$ stand for alkyl groups containing not more than three carbon atoms, which products are yellow powders dissolving in organic solvents, such as ethyl acetate and acetone, to yellow solutions and dyeing esters and ethers of cellulose similar tints.

4. Condensation products of the general formula

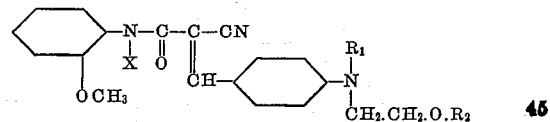

in which X stands for a radical of the group consisting of hydrogen and alkyl, and $R_1$ and $R_2$ stand for alkyl groups containing not more than three carbon atoms, which products are yellow powders dissolving in organic solvents, such as ethyl acetate and acetone, to yellow solutions and dyeing esters and ethers of cellulose similar tints.

5. The condensation product of the formula

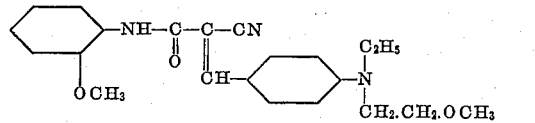

which product is a yellow powder dissolving in organic solvents, such as ethyl acetate and acetone to yellow solutions and dyeing the ester and ether of cellulose similar tints.

FRIEDRICH FELIX.
RUDOLF RUEGG.